United States Patent
Trandai et al.

(10) Patent No.: US 7,962,166 B1
(45) Date of Patent: Jun. 14, 2011

(54) METHOD FOR INDICATING A BAND PLAN FOR A TRUNKED RADIO COMMUNICATIONS SYSTEM

(75) Inventors: Tanhoa Trandai, Arlington Heights, IL (US); John M. Gilbert, Lake Zurich, IL (US); Donald R. Griffis, Sunrise, FL (US); Daniel J. McDonald, Cary, IL (US); Christopher H. Wilson, Lake Zurich, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 11/215,723

(22) Filed: Aug. 30, 2005

(51) Int. Cl.
*H04W 4/10* (2009.01)
*H04W 84/08* (2009.01)
(52) U.S. Cl. .................. 455/520; 455/509; 455/420
(58) Field of Classification Search ............... 455/418, 455/519
See application file for complete search history.

(56) References Cited

U.S. PATENT DOCUMENTS

| | | | |
|---|---|---|---|
| 4,612,415 A * | 9/1986 | Zdunek et al. | 455/454 |
| 4,646,345 A | 2/1987 | Zdunek et al. | |
| 4,716,407 A | 12/1987 | Borras et al. | |
| 4,723,264 A | 2/1988 | Sasuta et al. | |
| 4,870,408 A | 9/1989 | Zdunek et al. | |
| 4,905,302 A * | 2/1990 | Childress et al. | 455/515 |
| 5,054,068 A * | 10/1991 | Hess et al. | 380/270 |
| 5,125,103 A | 6/1992 | Grube et al. | |
| 5,185,797 A | 2/1993 | Barrett et al. | |
| 5,225,843 A | 7/1993 | Thompson | |
| 5,239,680 A * | 8/1993 | Grube et al. | 340/7.41 |
| 5,263,177 A | 11/1993 | Schieve et al. | |
| 5,265,262 A * | 11/1993 | Grube et al. | 455/17 |
| 5,408,466 A | 4/1995 | Ablay | |
| 5,493,695 A * | 2/1996 | Aitkenhead et al. | 455/509 |
| 6,188,979 B1 | 2/2001 | Ashley | |
| 6,252,910 B1 | 6/2001 | West et al. | |
| 6,308,050 B1 | 10/2001 | Eklof | |
| 6,584,324 B1 * | 6/2003 | Vivekanandan | 455/519 |
| 6,922,135 B2 | 7/2005 | Abraham | |

OTHER PUBLICATIONS

TIA TSB-102.AABC "Project 25 Trunking Control Channel Messages New Technology Standards Project Digital Radio Technical Standards TR-8.10 Subcomittee", May 31, 1996.
TIA TSB-102.AABD, "Project 25 Trunking Procedures New Technology Standards Project Digital Radio Technical Standards", Oct. 1997.

* cited by examiner

*Primary Examiner* — Philip J Sobutka
(74) *Attorney, Agent, or Firm* — Indira Saladi; Valerie M. Davis

(57) ABSTRACT

A receiving device in the trunked radio communications system receives an outbound signaling word comprising at least an opcode field and a band plan field, wherein the opcode field indicates that the outbound signaling message is a system status message and the band plan field indicates the band plan in use on the site. In another embodiment, the receiving device receives an outbound signaling word comprising at least an opcode field, a site identification field and a four bit band plan field, wherein the opcode field indicates that the outbound signaling message is an adjacent control channel message, the site identification field identifies a second site, and the four bit band plan field indicates the band plan in use on the second site.

20 Claims, 2 Drawing Sheets

200

300

METHOD FOR INDICATING A BAND PLAN FOR A TRUNKED RADIO COMMUNICATIONS SYSTEM

FIELD OF THE INVENTION

The present invention relates generally to trunked radio communications systems and more specifically to the field of indicating a band plan for a trunked radio communications systems.

BACKGROUND OF THE INVENTION

Generally, every trunked radio communications system has a band plan that defines how radio frequencies of a spectrum are utilized for the communications of the system. A band plan typically defines the frequency range of the spectrum and how channels are defined in the frequency range.

To accommodate the movement of a subscriber in a trunked radio communications system from a first site having a first band plan to a second site having a second band plan, where the subscriber is currently programmed for the first band plan, the subscriber needs to be reprogrammed with the second band plan before the subscriber can use the second site with the second band plan. This may occur if the subscriber is moving in an area served by sites having different band plans. For example, the subscriber may be within the vicinity of a first site having a band plan that adheres to National Public Safety Planning Advisory Committee (NPSPAC) channels in the 821-824 MHz range and move into the vicinity of a second site having a band plan that adheres to NPSPAC channels in the 806-809 range. Moreover, if the second site provides better service, then the subscriber may wish to switch to the second site but may not be able to unless the subscriber is able to operate with the second band plan.

Further, if a band plan of any specific site is changed (e.g. by reprogramming of the site), then all the subscribers associated with the site will not be able to operate until the subscribers are also reprogrammed to operate with the new band plan.

Currently, reprogramming of subscribers requires manual effort by radio service personnel so that the radio service personnel have direct physical access to a given subscriber. It is not always convenient or even possible, however, for all of the subscribers in a given system to be brought, more or less simultaneously, to a common location to permit the physical installation of a new band plan. As a result, the logistic challenge of reprogramming a new band plan for many subscribers can be challenging.

Thus, there is a need for an improved method of indicating a band plan in a trunked radio communications system.

BRIEF DESCRIPTION OF THE FIGURES

The present invention is illustrated by way of example and not limitation in the accompanying figures, in which like references indicate similar elements, and in which.

Figure 1:
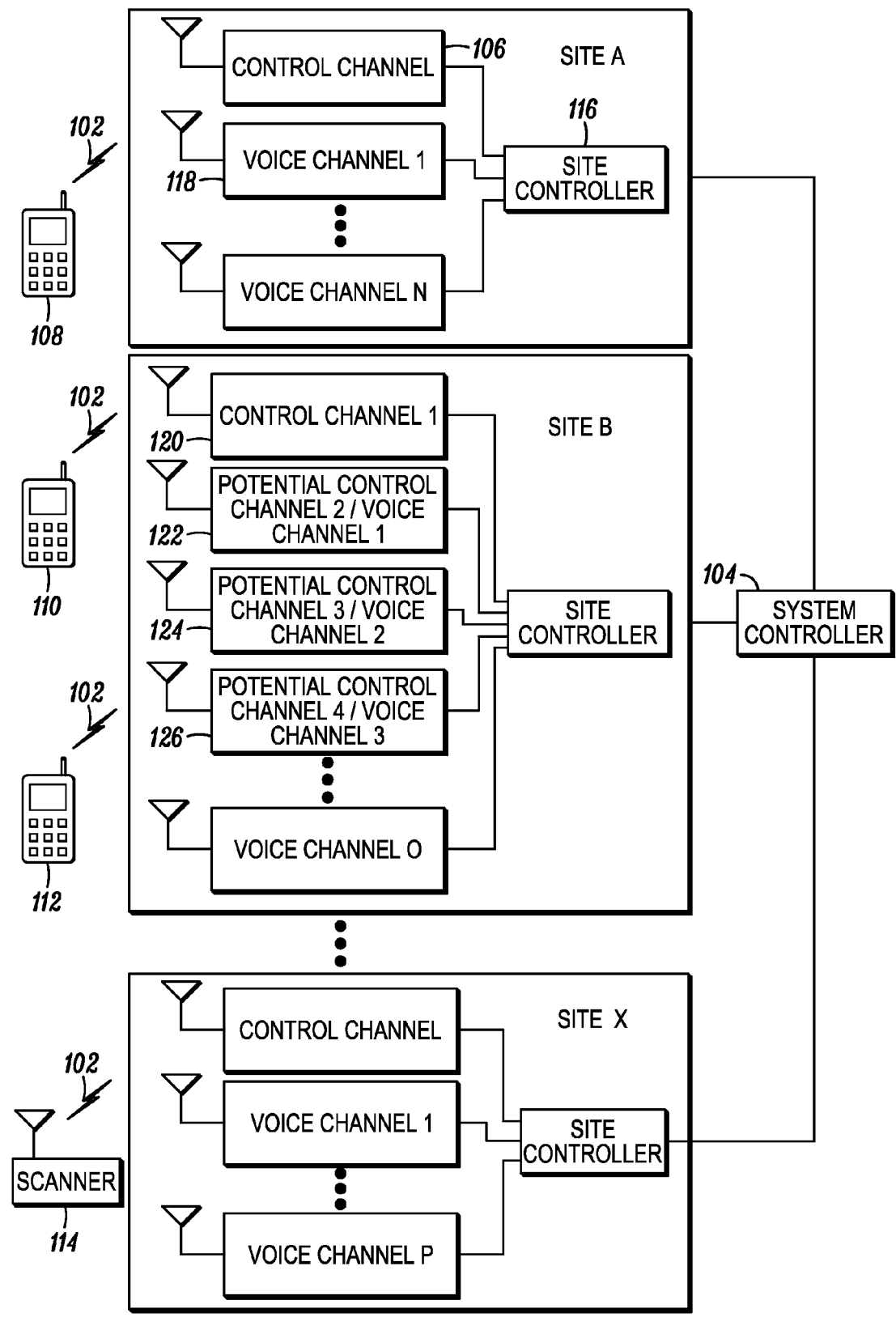
FIG. 1 is a block diagram illustrating a typical trunked communication system in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 illustrates a block diagram of a trunked radio communications system 100 that may employ an embodiment of the present invention. Typically, a trunked radio communications system 100 comprises at least one site, e.g. site A, and a plurality of receiving devices, e.g. receiving devices 108-114, so that the receiving devices can receive communications over a radio frequency (RF) resource 102. A site, e.g. site A, typically comprises at least one control channel, a number of voice channels, and a site controller that coordinates access to the RF resource 102 for the receiving devices associated with the site. For example, in FIG. 1, the site controller 116 for site A coordinates access to the RF resource 102 for receiving device 108.

As is known in the art, the RF resource 102 is a transmission medium. In one embodiment, the RF resource 102 comprises RF spectrum in the 800 MHz band. As such, the trunked radio communications system 100 operates in the 800 MHz spectrum.

As is known to one of ordinary skill in the art, the control and voice channels in each site are implemented using "repeaters," where a repeater is an electronic device that receives a RF signal and retransmits a RF signal at a higher power. Further, there is a repeater for each channel, whether voice or control, in the site. Thus, if there are 28 channels in site A, then there are 28 repeaters. Further, each site has a number of control channels and a number of voice channels, where each site has at least one control channel. As shown in FIG. 1, site A has one control channel 106 and N voice channels, where N represents the number of voice channels in site A. As is known to one of ordinary skill in the art, each site may have up to 4 control channels (with only 1 control channel active at one time and the others are potential control channels) and may have up to 27 voice channels (as such, N may be any number up to 27). Thus, illustrating only one control channel 106 for site A and one control channel 120 for site B in FIG. 1 is not meant to be a limitation on an embodiment of the present invention. For example, backup control channels for site B, namely potential control channels 122, 124, 126, are shown for ease in understanding. In any case, the number of control channels and the number of voice channels in one site together may not exceed 28. In any case, a site is defined by control channels, voice channels, and a site controller where the site interfaces with the receiving devices to carry the communications of the trunked radio communications system 100.

FIG. 1 illustrates a plurality of sites, site A, site B, . . . and site X, where X represents the number of sites in the trunked radio communications system 100. An embodiment of the present invention is contemplated to work in a trunked radio communications system 100 with any number of sites. Further, an embodiment of the present invention is contemplated to work in a trunked radio communications system with only one site, e.g. site A.

In a trunked radio communications system 100 of at least two sites, a system controller 104 acts as the system coordinator and is responsible for assigning subscribers 108, 110, 112 to different voice channels at different sites, e.g. site A, site B, so that the subscribers may communicate amongst each other. In a trunked radio communications system 100 of at least two sites, the site controller, e.g. site controller 116, functions to forward control channel messaging to the system controller 104. However, in a single site system, the site controller, e.g. site controller 116, performs the functionality performed by the system controller 104. Thus, as used henceforth, the term system controller 104 is used to encompass the functionality that may be performed by either the site controller or the system controller which is to forward control channel message so that the subscribers of the trunked radio communications system 100 may communicate amongst each other.

The system controller 104 is also responsible for knowing where each of the subscribers are located (i.e. what voice channel and/or what site) and for controlling other features typically found in a modern trunked communication system (e.g. handling phone patches, coordinating groups of radios in emergency situations, etc.). Further, the system controller 104 may comprise a database for keeping track of the subscribers. Typically, the database comprises information relating to keeping track of subscribers and information relating to the subscribers, such as IDs, talkgroup identifiers, and site location. For example, the database may contain information of subscriber 108 such as the subscriber's ID and that subscriber 108 is active in a call on voice channel 118. Further, the information in the database may be updated as the subscribers 108, 110, 112 move in the trunked radio communications system 100 from one site to another site. Further yet, the typical system controller 104 includes a main processing unit such as a computer with appropriate control software that controls the operation of system controller 104. Also normally co-located with the system controller 104 is a dispatch center with a dispatch console that allows dispatchers to communicate with the system's subscribers 108, 110, 112. In a single site system, the dispatch center may be co-located with the site controller 116.

The receiving devices 108-114 are typically mobile or portable devices, such as subscribers 108, 110, 112 and scanner 114. In one embodiment, the subscribers 108, 110, 112 are also known in the art as "radios," and can send and receive communications. In one embodiment, the scanner 114 is known by a number of names, including the term "receiver," "receiving device," "scanner device," and the like. In one embodiment, the scanner 114 is only able to receive communications and not able to send communications. In any case, the receiving devices listen to communications of the trunked radio communications system 100. Even though the terms "receiving device" and "subscriber" are both used in this description, the term "receiving device" is used to refer to the receiving function that is common to both "subscribers" and "scanners," whereas the term "subscriber" is used to refer to the receiving and transmitting operations that are functional in a "subscriber" but not in a "scanner."

In one embodiment, each site in the trunked radio communications system 100 operates with a band plan. For example, site A may operate with a first band plan and site B may operate with a second band plan. In one embodiment, the band plan for the site defines the frequency range and channel structure for communications in the system. Specifically in one embodiment, the band plan provides information relating to the usage of the radio frequencies by specifying the numbering scheme of the channels and the bandwidth for each channel. For example, the band plan for site A may be termed a "Band Plan 1-Re-band" to designate that the band plan for communications in the trunked radio communications system 100 operate in the 806-809 MHz range with a bandwidth of 12.5 kHz. Another example, the band plan for an adjacent site, e.g. site B, may be termed a "Domestic non-splinter" to designate that the band plan for communications in the adjacent site operate in the 809-817 MHz range with a bandwidth of 25.0 kHz.

Communications between the subscribers 108, 110, 112 and the system controller 104 can be of two directions, inbound and outbound. The signals that are sent from the system controller 104 to the subscribers 108, 110, 112 over the control channel 106 are typically called outbound signaling communications. In a specific embodiment, the outbound signaling is termed an Outbound Signaling Word (OSW). The control signals going from subscribers 108, 110, 112 to the system controller 104 over the control channel 106 are called inbound signaling communications. In a specific embodiment, the inbound signaling is termed an Inbound Signaling Word (ISW). As used herein, an OSW is an over-the-air message that informs the receiving devices, e.g. subscribers 108, 110, 112 and scanner 114, of the band plan for a specific site in the trunked radio communications system 100.

An example of a typical trunked communication begins when a receiving device (e.g. subscriber 108) enters a site (e.g. site A) coverage area and listens to a control channel (e.g. control channel 106) associated with the site. The receiving device listens to the control channel by tuning its receiver to an RF frequency associated with the control channel and detecting energy. The subscriber continues to listen to the control channel until the system controller 104 sends it an over-the-air message with information regarding status of the site and specifically the band plan of the site. In one embodiment, the over-the-air message is a system status message OSW that provides an indication of the band plan in use on the site, e.g. site A.

Figure 2:
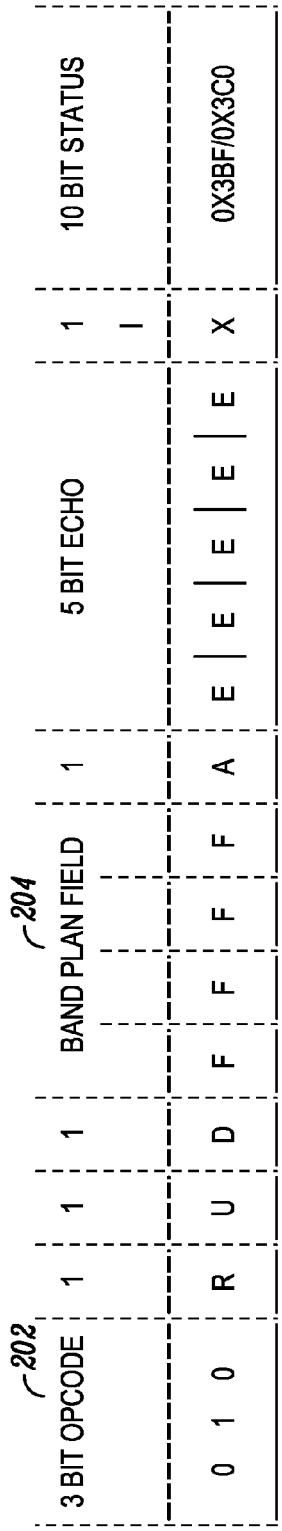
FIG. 2 is an example system status message OSW in accordance with an embodiment of the present invention.

Shown in FIG. 2 is an example system status message OSW 200 in accordance with an embodiment of the present invention. As shown, the system status message OSW 200 comprises a three bit opcode field 202. In one embodiment, the system status message OSW 200 has an opcode of binary value 010. In another embodiment, the system status message OSW 200 may comprise an opcode that has a different binary value. For example, the binary value of the system status opcode may be 101. Further, the system status message OSW 200 has a band plan field 204 that is used to convey the band plan of the site. In one embodiment, the band plan field 204 is four bits in length and may convey up to sixteen different band plans.

The below table represents a mapping between the band plan field 204 as shown in the system status message OSW 200 of FIG. 2 and the type of band plan that may be signaled using the band plan field 204. As shown in the below table, there are a number of combinations of the band plan field 204 (e.g. 0000) that do not indicate the type of band plan and appear to be unused. However, in one embodiment, the band plan field 204 may be used to indicate whether a subscriber should operate utilizing preprogrammed software, e.g. the subscriber's codeplug. Further, the band plan field may be used to indicate other band plans (not shown) that may not be currently known and will be designed in the future.

| Band plan Field 204 | Type of Band plan |
| --- | --- |
| 0000 | |
| 0001 | Band Plan 5 - International non-splinter & shuffle |
| 0010 | |
| 0011 | Band Plan 3 - Domestic non-splinter & shuffle |
| 0100 | |
| 0101 | Band Plan 2 - Re-band & Shuffle |
| 0110 | Band Plan 6 - International splinter & shuffle |
| 0111 | Band Plan 4 - Domestic splinter & shuffle |
| 1000 | International splinter |
| 1001 | International non-splinter |
| 1010 | Domestic splinter |
| 1011 | Domestic non-splinter |
| 1100 | |
| 1101 | Band Plan 1 - Re-band with non-splinter |
| 1110 | |
| 1111 | Band Plan 7 - Re-band with splinter |

Thus, when the receiving device receives the system status message OSW 200 with the band plan field 204 that indicates the band plan for the site that sent the system status message OSW, the receiving device is able to utilize the band plan information to tailor its operation to the band plan in use on the site. For example, if subscriber 108 receives a system status message OSW from site A with a band plan field that indicates a domestic splinter band plan, then the subscriber is able to calculate receive and transmit frequencies that correlate to channels in the domestic splinter band plan. Thus, when the subscriber is assigned a voice channel (e.g. voice channel 118) for the site, the subscriber is able to calculate the transmit frequency associated with the assigned channel for the domestic splinter band plan. The calculations associated with mapping a channel number to receive and transmit frequencies are beyond the scope of this disclosure.

In one embodiment, the system controller 104 provides information about the band plan in an adjacent site in the trunked radio communications system 100. Thus, when the receiving device, e.g. subscriber 108, is in coverage of site A, the receiving device, receives band plan information for sites adjacent to site A, e.g. site B. Thus, when the receiving device, e.g. subscriber 108, moves to site B, it has knowledge of the band plan in the adjacent site without having to wait for site B to provide band plan information for its site, e.g. via the system status message OSW 200, as described above.

Figure 3:
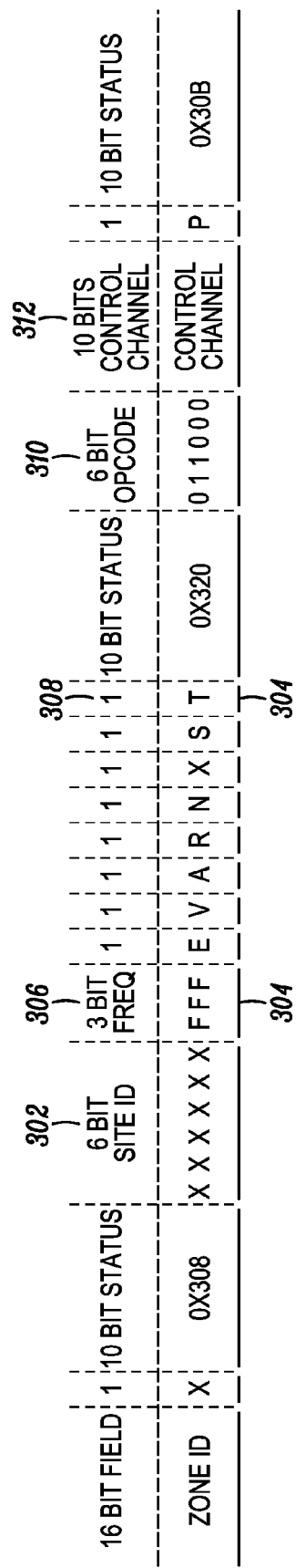
FIG. 3 is an example adjacent control channel message OSW in accordance with an embodiment of the present invention.

In such an embodiment, the system controller 104 sends an OSW providing adjacent site band plan information where the OSW is an adjacent control channel message OSW 300. In one embodiment, the adjacent control channel message OSW is a three word OSW where each word is 27 bits long. In such an embodiment, the adjacent control channel message OSW is defined by a six bit opcode field 310 having a binary value 011000. Shown in FIG. 3 is an example of the adjacent control channel message OSW 300 in accordance with an embodiment of the present invention. As such, the second word of the adjacent control channel message OSW 300 has a six bit site identification field 302 to identify the site that the adjacent control channel message OSW refers to. Further, the second word of the adjacent control channel message OSW 300 has a band plan field 304 to convey the band plan of the identified site. In one embodiment, the band plan field 304 is used to convey up to sixteen different band plans. In one embodiment, the band plan field 304 is a four bit noncontiguous field that is shown as fields 306, 308 in FIG. 3.

The below table represents a mapping between the band plan field 304, namely fields 306, 308, as shown in the second word of the adjacent control channel message OSW 300 of FIG. 3 and the type of band plan that may be signaled using the adjacent control channel message OSW. As shown in the below table, there are a number of combinations of the band plan field 304 (e.g. 0100) that do not indicate the type of band plan and appear to be unused. However, in one embodiment, the band plan field 304 may be used to indicate whether a subscriber should operate utilizing preprogrammed software, e.g. the subscriber's codeplug. Further, the band plan field may be used to indicate other band plans (not shown) that may not be currently known and will be designed in the future.

| Band plan Field 308 | Band plan Field 306 | Type of Band plan |
| --- | --- | --- |
| 0 | 000 | International splinter |
| 0 | 001 | International non-splinter |
| 0 | 010 | Domestic splinter |
| 0 | 011 | Domestic non-splinter |
| 0 | 100 | |
| 0 | 101 | Band Plan 1 - Re-band with non-splinter |
| 0 | 110 | Band Plan 7 - Re-band with splinter |
| 0 | 111 | |
| 1 | 000 | Band Plan 6 - International splinter & shuffle |
| 1 | 001 | Band Plan 5 - International non-splinter & shuffle |
| 1 | 010 | Band Plan 4 - Splinter & shuffle |
| 1 | 011 | Band Plan 3 - Non-splinter & shuffle |
| 1 | 100 | |
| 1 | 101 | Band Plan 2 - Re-band & shuffle |
| 1 | 110 | |
| 1 | 111 | |

In one embodiment, the adjacent control channel message OSW 300 also provides information about the band plan for potential control channels (also known as back control channels) in a site in the trunked radio communications system 100. Thus, when the receiving device, e.g. subscriber 108, is in coverage of site B, the receiving device, receives band plan information on control channel 120 for a backup control channel, e.g. potential control channels 122, 124, 126. In such an embodiment, the third word of the adjacent control channel message OSW 300 provides a control channel field 312 to signal the band plan for the control channel. In such an embodiment, the band plan field refers to the control channel identified in the control channel field 312. For example, the subscriber 108 may receive an adjacent control channel message OSW 300 on control channel 120 that informs the subscriber 108 about the band plan for the potential control channel 122.

In summary, the present invention provides a method for indicating a band plan in a trunked radio communications system. It allows a receiving device to be informed about the band plan without having to be reprogrammed about band plan changes at sites in the trunked radio communications system. By having such knowledge, subscribers are able to utilize the trunked radio communications system for communications. This invention greatly improves the logistics of updating a band plan for sites in a trunked radio communications system.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are in any frequency in the 800 MHz band and implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a trunked radio communications system operating in the 800 MHz spectrum wherein the trunked radio communications system comprises at least one site and a plurality of receiving devices, a method for indicating a band plan of the at least one site to a receiving device of the plurality of receiving devices, the method comprising the steps of:
    at the receiving device in the trunked radio communications system:
        receiving a 27 bit system status outbound signaling word from the at least one site comprising at least an opcode field and a band plan field, wherein
        (a) the opcode field indicates that the 27 bit system status outbound signaling word is a system status message, and
        (b) the band plan field indicates the band plan in use on the at least one site, wherein the band plan specifies a numbering scheme and bandwidth for a plurality of channels.

2. The method of claim 1 wherein the receiving device is at least one of a subscriber, a subscriber unit, a radio, a mobile, a portable, a receiver, a scanner, and a scanner device.

3. The method of claim 1 wherein the opcode field is a three bit field.

4. The method of claim 3 wherein the opcode field has a binary value of 010.

5. The method of claim 1 wherein the band plan field is a four bit field.

6. The method of claim 1 wherein the band plan field has at least one of values of 0001, 0011, 0101, 0110, 0111, 1000, 1001, 1010, 1011, 1101, and 1111.

7. The method of claim 1 further comprising receiving a second 27 bit outbound signaling word wherein the second 27 bit outbound signaling word indicates a band plan for an adjacent site in the trunked radio communications system.

8. The method of claim 1 further comprising receiving a three word outbound signaling word from a first site comprising at least an opcode field and a four bit band plan field, wherein the opcode field indicates that the three word outbound signaling word is an adjacent control channel message and the four bit band plan field indicates the band plan in use on a control channel in the at least one site.

9. The method of claim 8 wherein the opcode field is a six bit field.

10. The method of claim 9 wherein the opcode field has a binary value of 011000.

11. The method of claim 8 wherein the band plan field comprises noncontiguous bits of the adjacent control channel message.

12. In a trunked radio communications system operating in the 800 MHz spectrum wherein the trunked radio communications system comprises at least two sites and a plurality of receiving devices, a method for indicating a band plan to a receiving device of the plurality of receiving devices, the method comprising the steps of:
    at the receiving device in the trunked radio communications system:
        receiving an adjacent control channel outbound signaling word comprising three 27 bit words from a first site, wherein the adjacent control channel outbound signaling word comprises at least an opcode field, a site identification field and a four bit band plan field, wherein
        (a) the opcode field indicates that the three 27 bit words form the adjacent control channel outbound signaling word,
        (b) the site identification field identifies a second site, and
        (c) the four bit band plan field indicates the band plan in use on the second site, wherein the band plan specifies a numbering scheme and bandwidth for a plurality of channels.

13. The method of claim 12 wherein the receiving device is at least one of a subscriber unit, a radio, a mobile, a portable, a receiver, a scanner, and a scanner device.

14. The method of claim 12 wherein the opcode field is a six bit field.

15. The method of claim 14 wherein the opcode field has a binary value of 011000.

16. The method of claim 12 wherein the site identification field is a six bit field.

17. The method of claim 12 wherein the band plan field comprises noncontiguous bits of the adjacent control channel message.

18. The method of claim 12 wherein the band plan field has at least one of values of 0101, 0110, 1000, 1001, 1010, 1011, and 1101.

19. In a trunked radio communications system operating in the 800 MHz spectrum wherein the trunked radio communications system comprises at least two sites and a plurality of receiving devices, a method for indicating a band plan to a receiving device of the plurality of receiving devices, the method comprising the steps of:

at the receiving device in the trunked radio communications system:

receiving an adjacent control channel outbound signaling word comprising three 27 bit words from a first site, wherein the adjacent control channel outbound signaling word comprises at least an opcode field, a site identification field, a four bit band plan field, and a control channel field, wherein (a) the opcode field indicates that the three 27 bit words form the adjacent control channel outbound signaling word, (b) the site identification field identifies the first site, (c) the four bit band plan field indicates a band plan in use on a back up control channel of the first site and further indicates a band plan in use on the first site, wherein the band plan in use on the first site specifies a numbering scheme and bandwidth for a plurality of channels, and (d) the control channel field identifies the back up control channel for the first site.

20. The method of claim 19 wherein the receiving device is at least one of a subscriber, a subscriber unit, a radio, a mobile, a portable, a receiver, a scanner, and a scanner device.

* * * * *